(12) United States Patent  
Mehas et al.

(10) Patent No.: US 10,879,739 B2  
(45) Date of Patent: Dec. 29, 2020

(54) WIRELESS POWER TRANSMITTER REACTIVE ENERGY CONTROL

(71) Applicant: Integrated Device Technology, Inc., San Jose, CA (US)

(72) Inventors: Gustavo Mehas, Mercer Island, WA (US); David Wilson, Soquel, WA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 216 days.

(21) Appl. No.: 15/951,837

(22) Filed: Apr. 12, 2018

(65) Prior Publication Data

US 2018/0301938 A1 Oct. 18, 2018

Related U.S. Application Data

(60) Provisional application No. 62/484,787, filed on Apr. 12, 2017.

(51) Int. Cl.
| | |
|---|---|
| *H02J 50/05* | (2016.01) |
| *H02J 50/12* | (2016.01) |
| *H02J 50/40* | (2016.01) |
| *H02J 50/80* | (2016.01) |
| *H04B 5/00* | (2006.01) |

(52) U.S. Cl.  
CPC .............. *H02J 50/12* (2016.02); *H02J 50/05* (2016.02); *H02J 50/40* (2016.02); *H02J 50/80* (2016.02); *H04B 5/0037* (2013.01); *H04B 5/0081* (2013.01)

(58) Field of Classification Search  
CPC .. H02J 50/05; H02J 50/12; H02J 50/40; H02J 50/80; H04B 5/0037; H04B 5/0081  
See application file for complete search history.

(56) References Cited

U.S. PATENT DOCUMENTS

| 10,187,042 | B2 * | 1/2019 | Baarman | H01F 38/14 |
|---|---|---|---|---|
| 2015/0035376 | A1 * | 2/2015 | Baarman | H04B 5/0037 307/104 |
| 2016/0190816 | A1 * | 6/2016 | Rehm | H02J 50/00 307/104 |
| 2017/0126049 | A1 * | 5/2017 | Pan | H02J 7/025 |
| 2018/0204400 | A1 * | 7/2018 | Froitzheim | G07C 9/00714 |

* cited by examiner

*Primary Examiner* — Rexford N Barnie  
*Assistant Examiner* — Elim Ortiz  
(74) *Attorney, Agent, or Firm* — Haynes and Boone, LLP

(57) ABSTRACT

A wireless power transmitter according to some embodiments can include a transmitter circuit configured to be coupled across a series coupled capacitor and transmit coil; and a controller coupled to a node between the capacitor and the transmit coil, the controller configured to adjust a reactive energy in the series coupled capacitor and transmit coil in response to a change in operating frequency.

6 Claims, 2 Drawing Sheets

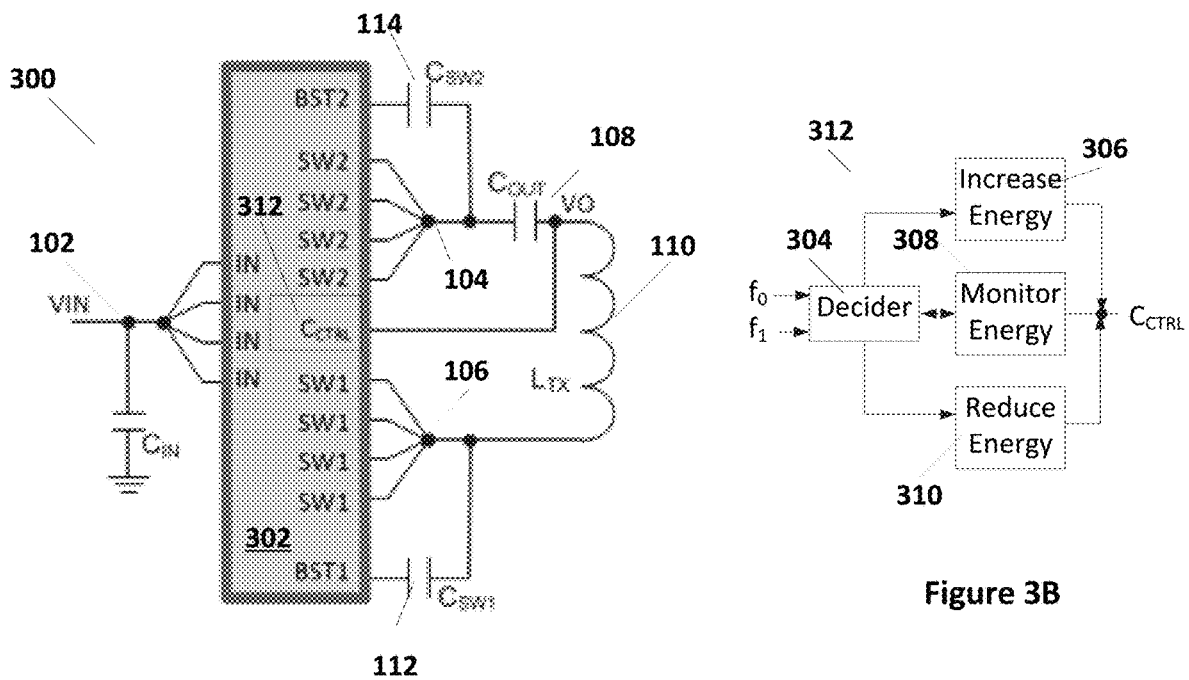
Figure 3A
Figure 3B
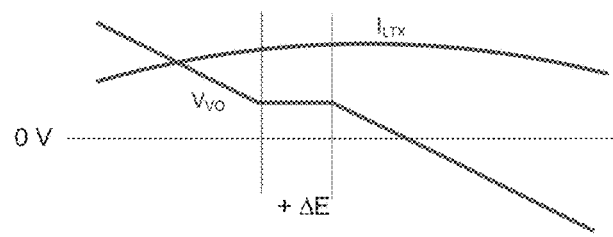
Figure 4
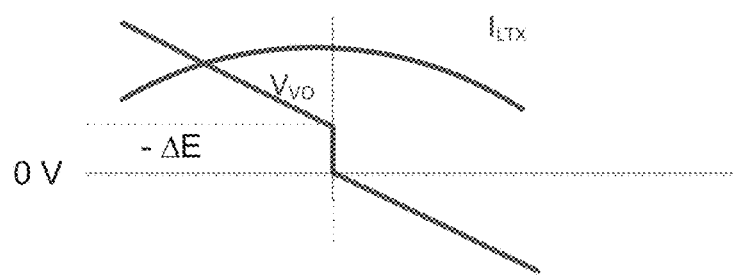
Figure 5

WIRELESS POWER TRANSMITTER REACTIVE ENERGY CONTROL

RELATED APPLICATIONS

The present disclosure claims priority to U.S. Provisional Application 62/484,787, filed Apr. 12, 2017, which is herein incorporated by reference in its entirety.

BACKGROUND

Technical Field

Embodiments of the present invention are related to wireless power transmitters and, in particular, to reactive energy control in wireless power transmitters.

Discussion of Related Art

Wireless transmitters provide AC power across a transmitter coil. As such, the wireless transmitter typically includes an inverter that converts a DC power input to an AC power output to drive the wireless transmitter. As such, typically a wireless transmitter includes DC input, may include buck or boost circuits along with filters to the DC input to the inverter. The inverter provides the AC power between two switching outputs SW1 and SW2, which are coupled to a transmit coil. The transmit coil generates a magnetic field, which is received by a receive coil in a receiver. Consequently, power is transmitted from the transmitter coil to the receiver coil.

In some cases, the transmit coil can also be used for communications with the receiver coil. The transmitter and the coil can communicate, for example, by modulating the frequency or amplitude of the power transmitted between the transmitter and the coil. In some cases, transmit Frequency Shift Keying (FSK) can be used to transmit data. FSK uses small transmit frequency changes to transmit information to the receiver. However, in some systems the change in operating frequency can result in a corresponding shift in the resonant operation of the system.

FIG. 1 illustrates a system 100 with a transmitter 116 coupled to a transmitter coil 110. System 100 can be a natural or pulse-width modulated tank circuit that includes the transmit coil 110 and capacitor 108 serially coupled between switched outputs SW2 and SW1 of transmitter 116. The output SW2 can be coupled through capacitor 114 to an output voltage BST2 while the output SW1 can be coupled through capacitor 112 to voltage BST1.

Consequently, transmit coil 110 and capacitor 108 form a tank circuit driven by the output voltage of transmitter 116. A transmit frequency change, which results during a FSK data transmission, results in a new resonant energy operation point for the transmit coil 110 and capacitor 108. Conventionally, system 100 can add energy or remove energy from the tank circuit "naturally," i.e. by parasitic resistances and average node voltages. In some cases, an open loop or closed loop of the PWM signals can be used to move the energy of the system to the new operating point "Faster." This method is limited by the modular gain (driving voltage) of system 100.

FIG. 2 shows an unmodified natural transition of V_VO vs I_LXT, the output voltage versus current through transmitter coil 110, as a function of time at a given frequency or during a frequency change (which on the scale shown is indistinguishable).

As is illustrated, it takes significant time for system 100 to adjust to a change in frequency, which limits the data transmission speed for FSK transmission. Consequently, there is a need for better methods of communication between the transmitter and receiver in a wireless transfer system.

SUMMARY

A wireless power transmitter according to some embodiments can include a transmitter circuit configured to be coupled across a series coupled capacitor and transmit coil; and a controller coupled to a node between the capacitor and the transmit coil, the controller configured to adjust a reactive energy in the series coupled capacitor and transmit coil in response to a change in operating frequency.

These and other embodiments are further discussed below with respect to the following figures.

BRIEF DESCRIPTION OF THE DRAWINGS

FIGS. 3A and 3B illustrate a wireless transmission system according to some embodiments of the present invention.

FIG. 4 illustrates an increase in the resonance energy produced by some embodiments.

FIG. 5 illustrates a decrease in the resonance energy produced by some embodiments.

DETAILED DESCRIPTION

Figure 1:
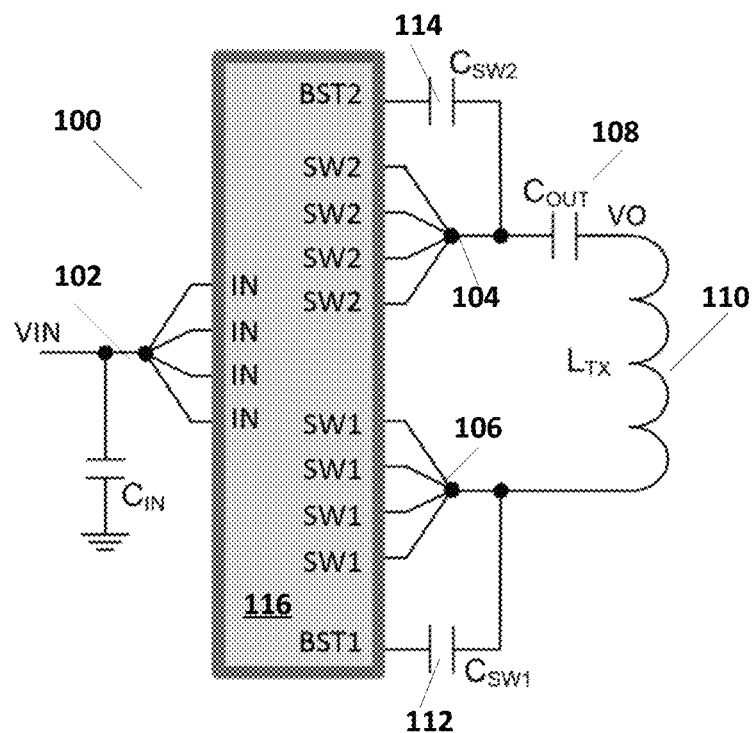
FIG. 1 illustrates a wireless power transmitter system.
Figure 2:
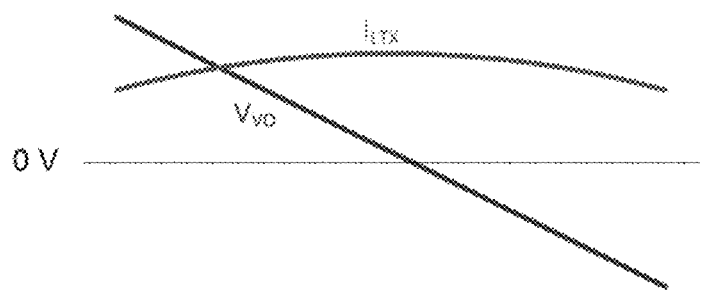
FIG. 2 illustrates a natural resonant transition according the system illustrated in FIG. 1.

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

FIG. 3A illustrates aspects of embodiments of the present invention. In accordance with some embodiments, direct control of the energy in the LC tank formed by transmit coil 110 and capacitor 108 is affected by a control circuit 312 in transmitter 302. As illustrated in FIG. 3A, a control line $C_{CTRL}$ is coupled to the node VO between capacitor 108 and transmit coil 110. Thus, the energy in the LC tank formed by capacitor 108 and transmit coil 110 can be directly controlled by transmitter 302. Further, transmitter 302 can be arranged such that disturbance time and magnitude can be controlled to match the new operating point by adjusting the resonant energy for a particular frequency of operation. Furthermore, system 300 can be flexible enough to change the frequency every half cycle.

FIG. 3B illustrates a block diagram of an embodiment of control block 312. As illustrated in FIG. 3B, an energy monitor 308 is coupled to the node VO from $C_{CTRL}$. The voltage at node VO, $V_{VO}$, is input to energy monitor 308. Energy monitor 308, from the known properties of coil 110 and capacitor 108, may further determine the current through transmit coil 110, $I_{LTX}$, in order to determine the energy stored in the LC circuit formed by capacitor 108 and transmit coil 110. The energy level can be provided to a decider block 304. Decider 304 receives the currently operating frequency $f_0$ along with a new frequency $f_1$ to which system 300 is to transition. Decider 304 then determines whether to increase the energy or reduce the energy in the LC circuit formed by capacitor 108 and transmit coil 110 based on the projected energy in the LC current at the new frequency $f_1$. Decider 304 activates either increase energy 306 or reduce energy 310 based on its decision. Increase energy 306 can, for example, inject current to hold a constant voltage at node VO in order to increase the energy in the LC circuit. Reduce energy 310 can reduce voltage at node VO to decrease the energy in the LC circuit.

FIG. 4 illustrates an energy increase. As is illustrated, the voltage $V_{VO}$ is held at a constant value for a period of time sufficient to increase the energy by ΔE. FIG. 5 illustrates an energy decrease. As illustrated in FIG. 5, the voltage $V_{VO}$ is decreased to decrease the energy by an amount ΔE appropriate for the new operating frequency $f_1$. As discussed above, decider 304 can initiate the change in energy in advance of the transition to the new operating frequency in order to decrease the reaction time of system 300. In particular, Energy may be injected or removed from the LC circuit by adjusting the charge, voltage, or magnetic flux of the transmit coil.

As discussed above, the transmit coil 110 and capacitor 108 form a resonant LC circuit. At a given operating frequency $f_0$ there is a specific amount of reactive energy in the LC circuit. During an FSK data transmission, system 300 is transitioned to a new operating frequency $f_1$. The speed at which data can be transmitted through transmitter coil 110 in system 300, therefore, depends on the speed with which the LC circuit can transition to a new reactive power setting. Control circuit 312 can add or subtract the amount of energy needed in the LC circuit to facilitate transition to the new operating frequency $f_1$. With a flexible energy transfer method, the time taken to inject or remove the energy can match the time difference in periods between the original frequency and the new frequency.

The control circuit can use the voltages Vin and GND in order to affect the transition. The transition can result in a momentary frequency energy mismatch. The next cycle may begin at the current frequency energy operating point. Embodiments of the present invention provides for a simplified operation, but may involve high voltage devices in a single transmitter chip such as transmitter 302. However, in some embodiments external capacitors, inductors, and other energy transfer components that can mitigate use of high voltage internal devices can be located outside of the transmitter chip itself.

Obviously, many modifications and variations of the present invention are possible in light of the above teachings. It is therefore to be understood that, within the scope of the appended claims, the invention many be practiced otherwise than as specifically described. The above detailed description is provided to illustrate specific embodiments of the present invention and is not intended to be limiting. Numerous variations and modifications within the scope of the present invention are possible. The present invention is set forth in the following claims.

What is claimed is:

1. A wireless power transmitter, comprising: a transmitter circuit configured to be coupled across a series coupled capacitor and transmit coil; and a controller coupled to a node between the capacitor and the transmit coil to control a reactive energy of the transmit circuit and to determine energy stored in the transmitter coil, the controller further coupled to receive a current operating frequency and a new frequency, the controller adjusting the reactive energy in the series coupled capacitor and transmit coil based on a projected energy for the new frequency as the current operating frequency is transitioned to the new frequency, wherein the reactive energy is adjusted according to the projected energy that is appropriate for operation at a new frequency.

2. The transmitter of claim 1, wherein the reactive energy can be adjusted within a cycle.

3. The transmitter of claim 1, wherein frequency shift keying data transmission can be used and wherein the new frequency is determined by frequency shift of a frequency shift keying modulation.

4. The transmitter of claim 1, wherein the reactive energy is adjusted by adjusting a voltage at the node.

5. The transmitter of claim 1, wherein the reactive energy is adjusted by adjusting a charge on the capacitor.

6. The transmitter of claim 1, wherein the reactive energy is adjusted by adjusting a magnetic flux of the transmit coil.

* * * * *